US007646718B1

(12) United States Patent  
Kondapalli et al.

(10) Patent No.: US 7,646,718 B1  
(45) Date of Patent: Jan. 12, 2010

(54) FLEXIBLE PORT RATE LIMITING

(75) Inventors: Raghu Kondapalli, San Jose, CA (US); Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 833 days.

(21) Appl. No.: 11/256,465

(22) Filed: Oct. 21, 2005

Related U.S. Application Data (60) Provisional application No. 60/673,106, filed on Apr. 18, 2005, provisional application No. 60/696,278, filed on Jun. 29, 2005.

(51) Int. Cl.
*G01R 31/08* (2006.01)

(52) U.S. Cl. .................... 370/235.1; 370/230

(58) Field of Classification Search ........... 370/235.1
See application file for complete search history.

(56) References Cited

U.S. PATENT DOCUMENTS

| | | | | |
|---|---|---|---|---|
| 6,578,082 | B1* | 6/2003 | Ho et al. ............... | 709/233 |
| 6,826,150 | B1* | 11/2004 | Bhattacharya et al. ... | 370/230 |
| 2001/0012272 | A1* | 8/2001 | Aubert et al. ........... | 370/230 |
| 2002/0152306 | A1* | 10/2002 | Tuck, III ............... | 709/224 |
| 2003/0123390 | A1* | 7/2003 | Takase et al. .......... | 370/230.1 |
| 2004/0081169 | A1* | 4/2004 | Kloth et al. ........... | 370/395.51 |
| 2004/0105435 | A1* | 6/2004 | Morioka ................ | 370/359 |
| 2005/0019033 | A1* | 1/2005 | Oh et al. ............... | 398/58 |
| 2005/0141426 | A1* | 6/2005 | Hou ..................... | 370/235 |

OTHER PUBLICATIONS

Leaky Bucket, from Wikipedia, Aug. 12, 2005; 3 pages.
Token Bucket, from Wikipedia, Aug. 10, 2005, 2 pages.
Address Resoultion Protocol (arp), Aug. 10, 2005; 3 pages.
BPDU, from Wikipedia, Aug. 10, 2005, 1 page.
DOCSIS, from Wikipedia, Aug. 12, 2005, 3 pages.
IEEE Std 801.1X-2004 (Revision of IEEE Std 802.1X-2001), IEEE Standard for Local and metropolitan area networks, Port-Based Network Access Control; IEEE Computer Society, Sponsored by the LAN/MAN Standards Committee, Dec. 13, 2004; 179 pages.

* cited by examiner

*Primary Examiner*—Kwang B Yao
*Assistant Examiner*—Jutai Kao (57) ABSTRACT

A switching device comprises M ports, N bandwidth tracking modules, a mapping memory, and a rate limiting module. The N bandwidth tracking modules each have an adjustable first threshold, an adjustable rate, and a fullness level, wherein M and N are integers that are greater than one. The mapping memory contains a map for each of the M ports, wherein each map assigns a set of the N bandwidth tracking modules to a corresponding one of the M ports, wherein each of the sets is individually modifiable to include zero to N of the N bandwidth tracking modules. The rate limiting module that selectively performs an action on a packet received at one of the M ports based on the fullness levels of the set of N bandwidth tracking modules identified by the map for the one of the M ports.

49 Claims, 8 Drawing Sheets

| Parameter | Description | # Bits |
|---|---|---|
| VID_NRL | VLAN ID Non Rate Limit- When set, rate limiting is disabled for packets whose VID entry in the VLAN database contains a set Non Rate Limit bit | 1 |
| SA_NRL | Source Address Non Rate Limit- When set, rate limiting is disabled for packets whose SA entry in the switch table contains a set Non Rate Limit bit | 1 |
| DA_NRL | VLAN ID Non Rate Limit- When set, rate limiting is disabled for packets whose VID entry in the VLAN database contains a set Non Rate Limit bit | 1 |
| FC_Mode | Flow Control Mode- determines when flow control is deasserted<br>= 0 deassert when bucket becomes empty<br>= 1 deassert when bucket is less than EBS − CBS | 1 |
| Rate_Resource | N-bit bit field, where N is the number of buckets. The kth bucket is assigned to this port when the kth Rate_Resource bit is set. | 12 |

FIG. 8

| Parameter | Description | # Bits |
|---|---|---|
| CBS_Limit | Committed Burst Size limit- This indicates the committed burst amount. | 24 |
| EBS_Limit | Excess Burst Size limit- This effectively indicates the size of the bucket. | 24 |
| EBS_Limit_Action | If the incoming port information rate exceeds the EBS_Limit, this field specifies the action that needs to be taken for the violating traffic.<br>= 0 discard the packet<br>= 1 assert flow control | 1 |
| Account_Q_Congest | = 0 ignore packets discarded because of queue congestion<br>= 1 count packets discarded because of queue congestion | 1 |
| Account_Filtered | = 0 ignore packets filtered in switch<br>= 1 count packets filtered in switch | 1 |
| Bucket_Rate_Factor | This indicates the number of tokens to remove from the bucket per time interval (porportional to the Committed Information Rate). | 16 |
| Bucket_Rate_Type | = 0 bucket is packet type based<br>= 1 bucket is rate based | 1 |
| Bucket_Type_Mask | This bitfield is used when Bucket_Rate_Type = 0.<br>Count bytes from packet types:<br>[0] - Unknown Unicast<br>[1] - Unknown Multicast<br>[2] - Broadcast<br>[3] - Multicast<br>[4] - Unicast<br>[5] - Management<br>[6] - ARP | 11 |
| Bits_To_Count | This bitfield is used when Bucket_Rate_Type = 1.<br>Count all bits except for:<br>[0] - Layer 1 bits<br>[1] - Layer 2 bits | 4 |
| Bucket_Increment | This indicates the number of tokens that need to be added per each bucket increment. | 12 |
| Bucket_Token_Count | This indicates the current number of tokens available in the current bucket. The initial value is expected to be programmed by software as part of the chip initialization. | 24 |
| Last_Updated_Time | This indicates the last time the bucket was updated with tokens. | 8 |
| Bytes_Dropped | This indicates the number of bytes of dropped packets corresponding to the bucket. This counter does not have a maximum value and so it wraps around. | 16 |
| Bytes_Received | This indicates the number of bytes of packets corresponding to the bucket. This counter does not have a maximum value and so it wraps around. | 16 |

FLEXIBLE PORT RATE LIMITING

CROSS-REFERENCE TO RELATED APPLICATIONS

This application claims the benefit of U.S. Provisional Application No. 60/673,106, filed on Apr. 18, 2005, and U.S. Provisional Application No. 60/696,278, filed on Jun. 29, 2005, which are incorporated herein by reference in their entirety.

FIELD OF THE INVENTION

The present invention relates to rate-limiting in a network device.

BACKGROUND OF THE INVENTION

Figure 1:
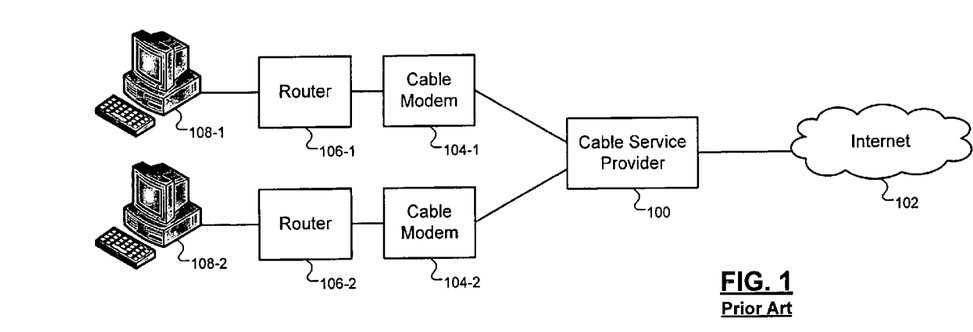
FIG. 1 is a functional block diagram of an exemplary cable modem broadband system according to the prior art.

Referring now to FIG. 1, a functional block diagram of an exemplary cable modem broadband system according to the prior art is depicted. A cable service provider 100 communicates with the Internet 102. The cable service provider communicates with first and second cable modems 104-1 and 104-2. End users connect routers 106-1 and 106-2 to the cable modems 104-1 and 104-2, respectively. Users then connect computers 108-1 and 108-2 to the routers 106-1 and 106-2, respectively. The users have Service Level Agreements (SLAs) with the cable service provider 100 that define their terms of service, including bandwidth limits. The cable service provider 100 programs each of the cable modems 104 with respectively allowed bandwidth rates using a mechanism such as DOCSIS (Data Over Cable Service Interface Specification). In this way, each traffic flow arriving at the cable service provider 100 is rate-shaped by the respective cable modem 104.

Figure 2:
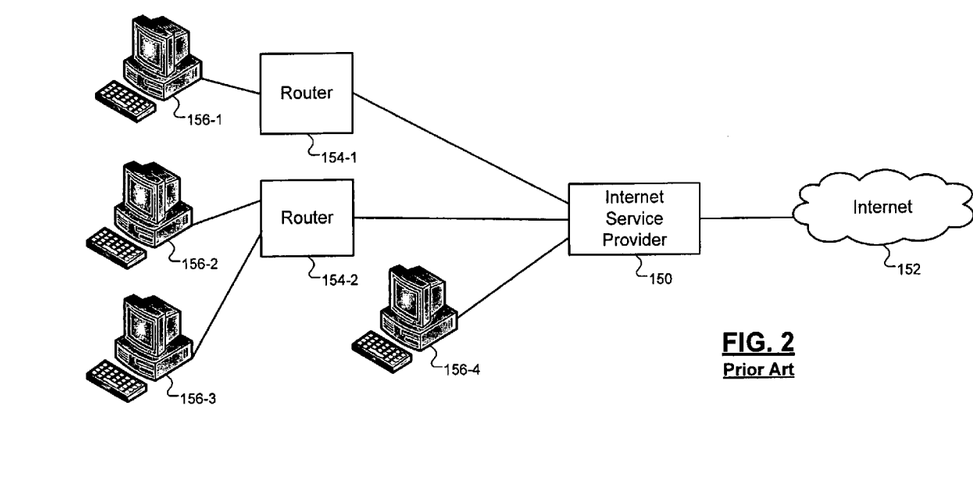
FIG. 2 is a functional block diagram of direct connection to an Internet Service Provider (ISP) according to the prior art.

In a direct broadband system, such as is widely deployed in South Korea, computers and/or routers connect directly to an Internet Service Provider (ISP) 150, as depicted in FIG. 2. The ISP maintains a connection to the Internet 152, and communicates with routers 154-1 and 154-2. Computer 156-1 is connected to router 154-1, and computers 156-2 and 156-3 are connected to router 154-2. Computer 156-4 communicates directly to the ISP 150. In this exemplary scenario, none of the data flows arriving at the ISP 150 are rate-shaped, and so may arrive at full line speed (e.g., 100 Mbps). Users transmitting at full line speed may use so much bandwidth that the quality of service for other users is diminished. The ISP 150 would like to be able to apportion available bandwidth among the users, possibly offering higher levels of service (such as greater bandwidth) for increased fees.

Figure 3:
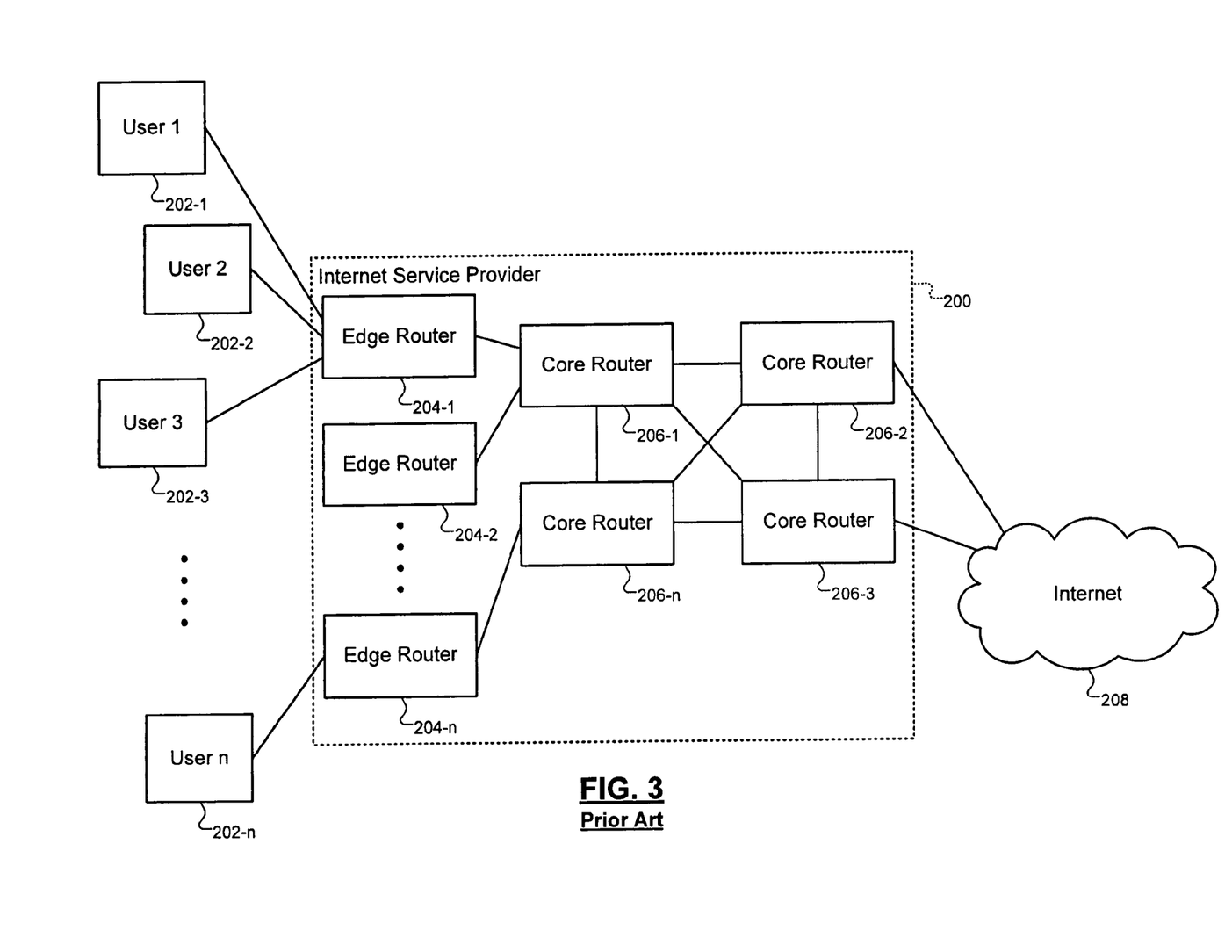
FIG. 3 is a functional block diagram of an exemplary ISP network according to the prior art.

Referring now to FIG. 3, a functional block diagram of an exemplary Internet Service Provider (ISP) network is depicted. The ISP 200 services a number of users 202-1, 202-2, 202-3, . . . , and 202-n. The users 202 communicate with edge routers 204-1, 204-2, . . . , and 204-n. The edge routers 204 typically communicate with core routers 206-1, 206-2, 206-3, 206-4, . . . . Core routers 206 interconnect with each other and possibly communicate with the Internet 208, as core routers 206-2 and 206-3 do in this example.

SUMMARY OF THE INVENTION

A switching device comprises M ports, N bandwidth tracking modules, a mapping memory, and a rate limiting module. The N bandwidth tracking modules each have an adjustable first threshold, an adjustable rate, and a fullness level, wherein M and N are integers that are greater than one. The mapping memory contains a map for each of the M ports, wherein each map assigns a set of the N bandwidth tracking modules to a corresponding one of the M ports, wherein each of the sets is individually modifiable to include zero to N of the N bandwidth tracking modules. The rate limiting module that selectively performs an action on a packet received at one of the M ports based on the fullness levels of the set of N bandwidth tracking modules identified by the map for the one of the M ports.

In other features, the rate limiting module decreases the fullness levels of each of the N bandwidth tracking modules at the rates, and selectively increases the fullness levels of the set of N bandwidth tracking modules identified by the map for the one of the M ports. The packet is selectively exempted from the action. The packet is selectively exempted from the action based upon a property of the packet, wherein the property includes at least one of VLAN ID, source address, and destination address.

In further features, a bandwidth tracking module memory includes an array of N values to store the fullness levels of the N bandwidth tracking modules. The bandwidth tracking module memory also stores the first thresholds and the rates of the N bandwidth tracking modules. The rate limiting module selectively increases the fullness level of one of the N bandwidth tracking modules by a number based upon the packet using a calculation that can be adjusted individually for each one of the N bandwidth tracking modules.

In still other features, the calculation can be selected from at least one of a packet size calculation and a packet criteria calculation. The packet size calculation causes the number to be proportional to a size in bytes of the packet. The number is equal to the size in bytes multiplied by a multiplier, wherein the multiplier can be adjusted individually for each of the N bandwidth tracking modules. The size in bytes excludes a portion of bits of the packet, wherein the portion can be adjusted individually for each of the N bandwidth tracking modules.

In other features, the portion includes at least one of layer one bits, layer two bits, and layer three bits. Selecting the packet criteria calculation causes the number to be proportional to a size in bytes of the packet if the packet meets certain criteria, and equal to zero otherwise, wherein the criteria can be modified individually for each of the N bandwidth tracking modules. The criteria include packet type, and wherein the packet type is determined from information within the packet.

In further features, the packet type includes at least one of unknown unicast, unknown multicast, broadcast, multicast, unicast, BPDU, ICMP, and ARP. The rate limiting module uses a clock slowed by a divisor to decrease the fullness levels of the N bandwidth tracking modules, and wherein the divisor is selectable. A port setting memory contains settings for each of the M ports, including a setting specifying when to exempt the packet from the action. The port setting memory includes the mapping memory.

In still other features, the action is determined based upon individual actions dictated by the set of N bandwidth tracking modules identified by the map for the one of the M ports. An individual action of one of the N bandwidth tracking modules includes a first action type when a number corresponding to the packet would increase the fullness level of the one of the N bandwidth tracking modules above the first threshold, and includes a second action type otherwise.

In other features, the action types include at least one of discarding the packet, asserting flow control on the one of the M ports, and accepting the packet. The action includes discarding the packet when any of the individual actions include discarding the packet, and includes asserting flow control when any of the individual actions include asserting flow control. The N bandwidth tracking modules each have an individually defined second threshold, and wherein the action is determined based upon individual actions dictated by the set of N bandwidth tracking modules identified by the map for the one of the M ports.

In further features, an individual action of one of the N bandwidth tracking modules includes a first action type when a number corresponding to the packet would increase the fullness level of the one of the N bandwidth tracking modules above the second threshold, a second action type when the number would increase the fullness level of the one of the N bandwidth tracking modules above the first threshold, and a third action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control. N is greater than M.

A switching method comprises receiving a packet at one of M ports; setting a first threshold, a rate, and a fullness level for each of N bandwidth tracking modules, wherein M and N are integers that are greater than one; establishing an assignment for each of the M ports, wherein each assignment is from a set of the N bandwidth tracking modules to a corresponding one of the M ports, and wherein each of the sets is individually modifiable to include zero to N of the N bandwidth tracking modules; and selectively performing an action on the packet based upon fullness levels of the set of N bandwidth tracking modules identified by the assignment for the one of the M ports.

In other features, the method includes decreasing the fullness levels of each of the N bandwidth tracking modules at the rates, and selectively increasing the fullness levels of the set of N bandwidth tracking modules identified by the assignment for the one of the M ports. The packet is selectively exempted from the performing based upon a property of the packet, wherein the property includes at least one of VLAN ID, source address, and destination address.

In further features, the increasing includes calculating a number based upon the packet and increasing the fullness level of a corresponding one of the N bandwidth tracking modules by the number, wherein the calculating can be varied individually for each of the N bandwidth tracking modules, The calculating includes at least one of a packet size calculation and a packet criteria calculation. The packet size calculation results in the number being proportional to a size in bytes of the packet. The packet size calculation includes multiplying the size in bytes by a multiplier, wherein the multiplier can be adjusted individually for each of the N bandwidth tracking modules.

In still other features, the method includes excluding a portion of bits of the packet from the size in bytes, wherein the portion can be adjusted individually for each of the N bandwidth tracking modules. The portion includes at least one of layer one bits, layer two bits, and layer three bits. The packet criteria calculation results in the number being proportional to a size in bytes of the packet if the packet meets certain criteria, and equal to zero otherwise, wherein the criteria can be modified individually for each of the N bandwidth tracking modules.

In other features, the criteria include packet type, and wherein the packet type is determined from information within the packet. The packet type includes at least one of unknown unicast, unknown multicast, broadcast, multicast, unicast, BPDU, ICMP, and ARP. A clock is slowed by a divisor to determine times at which to decrease the fullness levels of the N bandwidth tracking modules, wherein the divisor is selectable. The action is determined based upon individual actions specified for the set of N bandwidth tracking modules identified by the assignment for the one of the M ports.

In further features, an individual action of one of the N bandwidth tracking modules includes a first action type when a number corresponding to the packet would increase the fullness level of the one of the N bandwidth tracking modules above the first threshold, and includes a second action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control. The N bandwidth tracking modules each have an individually defined second threshold, and further comprising determining the action based upon individual actions dictated by the set of N bandwidth tracking modules identified by the assignment for the one of the M ports.

In still other features, an individual action of one of the N bandwidth tracking modules includes a first action type when a number corresponding to the packet would increase the fullness level of the one of the N bandwidth tracking modules above the second threshold, a second action type when the number would increase the fullness level of the one of the N bandwidth tracking modules above the first threshold, and a third action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control. N is greater than M.

A switching device comprises M ports; N bandwidth tracking means for storing fullness levels, each having an adjustable first threshold and an adjustable rate, wherein M and N are integers that are greater than one; mapping means for storing a map for each of the M ports, wherein each map assigns a set of the N bandwidth tracking means to a corresponding one of the M ports, wherein each of the sets is individually modifiable to include zero to N of the N bandwidth tracking means; and rate limiting means for selectively performing an action on a packet received at one of the M ports based on the fullness levels of the set of N bandwidth tracking means identified by the map for the one of the M ports.

In other features, the rate limiting means decreases the fullness levels of each of the N bandwidth tracking means at the rates, and selectively increases the fullness levels of the set of N bandwidth tracking means identified by the map for the one of the M ports. The packet is selectively exempted from the action. The packet is selectively exempted from the action based upon a property of the packet, wherein the property includes at least one of VLAN ID, source address, and destination address.

In further features, bandwidth tracking memory means stores the fullness levels of the N bandwidth tracking means in an array of N values. The bandwidth tracking memory means also stores the first thresholds and the rates of the N bandwidth tracking means. The rate limiting means selectively increases the fullness level of one of the N bandwidth tracking means by a number based upon the packet using a calculation that can be adjusted individually for each one of the N bandwidth tracking means. The calculation can be selected from at least one of a packet size calculation and a packet criteria calculation.

In still other features, the packet size calculation causes the number to be proportional to a size in bytes of the packet. The number is equal to the size in bytes multiplied by a multiplier, wherein the multiplier can be adjusted individually for each of the N bandwidth tracking means. The size in bytes excludes a portion of bits of the packet, wherein the portion can be adjusted individually for each of the N bandwidth tracking means. The portion includes at least one of layer one bits, layer two bits, and layer three bits.

In other features, selecting the packet criteria calculation causes the number to be proportional to a size in bytes of the packet if the packet meets certain criteria, and equal to zero otherwise, wherein the criteria can be modified individually for each of the N bandwidth tracking means. The criteria include packet type, and wherein the packet type is determined from information within the packet. The packet type includes at least one of unknown unicast, unknown multicast, broadcast, multicast, unicast, BPDU, ICMP, and ARP.

In further features, clock means decreases the fullness levels of the N bandwidth tracking means, wherein the clock means is slowed by a selectable divisor. Port setting means stores settings for each of the M ports, including a setting specifying when to exempt the packet from the action. The port setting means includes the mapping means. The action is determined based upon individual actions dictated by the set of N bandwidth tracking means identified by the map for the one of the M ports.

In still other features, an individual action of one of the N bandwidth tracking means includes a first action type when a number corresponding to the packet would increase the fullness level of the one of the N bandwidth tracking means above the first threshold, and includes a second action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control.

In other features, the N bandwidth tracking means each have an individually defined second threshold, and wherein the action is determined based upon individual actions dictated by the set of N bandwidth tracking means identified by the map for the one of the M ports. An individual action of one of the N bandwidth tracking means includes a first action type when a number corresponding to the packet would increase the fullness level of the one of the N bandwidth tracking means above the second threshold, a second action type when the number would increase the fullness level of the one of the N bandwidth tracking means above the first threshold, and a third action type otherwise.

The action types include at least one of discarding the packet, asserting flow control on the one of the M ports, and accepting the packet. The action includes discarding the packet when any of the individual actions include discarding the packet, and includes asserting flow control when any of the individual actions include asserting flow control. N is greater than M.

A computer program executed by a processor comprises receiving a packet at one of M ports; setting a first threshold, a rate, and a fullness level for each of N bandwidth tracking modules, wherein M and N are integers that are greater than one; establishing an assignment for each of the M ports, wherein each assignment is from a set of the N bandwidth tracking modules to a corresponding one of the M ports, and wherein each of the sets is individually modifiable to include zero to N of the N bandwidth tracking modules; and selectively performing an action on the packet based upon fullness levels of the set of N bandwidth tracking modules identified by the assignment for the one of the M ports.

In other features, the program further comprises decreasing the fullness levels of each of the N bandwidth tracking modules at the rates, and selectively increasing the fullness levels of the set of N bandwidth tracking modules identified by the assignment for the one of the M ports. The packet is selectively exempted from the performing based upon a property of the packet, wherein the property includes at least one of VLAN ID, source address, and destination address. The increasing includes calculating a number based upon the packet and increasing the fullness level of a corresponding one of the N bandwidth tracking modules by the number, wherein the calculating can be varied individually for each of the N bandwidth tracking modules.

In further features, the calculating includes at least one of a packet size calculation and a packet criteria calculation. The packet size calculation results in the number being proportional to a size in bytes of the packet. The packet size calculation includes multiplying the size in bytes by a multiplier, wherein the multiplier can be adjusted individually for each of the N bandwidth tracking modules.

In still other features, the program further comprises excluding a portion of bits of the packet from the size in bytes, wherein the portion can be adjusted individually for each of the N bandwidth tracking modules. The portion includes at least one of layer one bits, layer two bits, and layer three bits. The packet criteria calculation results in the number being proportional to a size in bytes of the packet if the packet meets certain criteria, and equal to zero otherwise, wherein the criteria can be modified individually for each of the N bandwidth tracking modules. The criteria include packet type, and wherein the packet type is determined from information within the packet. The packet type includes at least one of unknown unicast, unknown multicast, broadcast, multicast, unicast, BPDU, ICMP, and ARP.

In other features, the program further comprises slowing a clock by a divisor to determine times at which to decrease the fullness levels of the N bandwidth tracking modules, wherein the divisor is selectable. The program further comprises determining the action based upon individual actions specified for the set of N bandwidth tracking modules identified by the assignment for the one of the M ports.

In further features, an individual action of one of the N bandwidth tracking modules includes a first action type when a number corresponding to the packet would increase the fullness level of the one of the N bandwidth tracking modules above the first threshold, and includes a second action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control. The N bandwidth tracking modules each have an individually defined second threshold, and further comprising determining the action based upon individual actions dictated by the set of N bandwidth tracking modules identified by the assignment for the one of the M ports.

In still other features, an individual action of one of the N bandwidth tracking modules includes a first action type when a number corresponding to the packet would increase the fullness level of the one of the N bandwidth tracking modules above the second threshold, a second action type when the number would increase the fullness level of the one of the N bandwidth tracking modules above the first threshold, and a third action type otherwise. The action types include at least one of discarding the packet, asserting flow control on the one of the M ports, and accepting the packet. The action includes discarding the packet when any of the individual actions include discarding the packet, and includes asserting flow control when any of the individual actions include asserting flow control. N is greater than M.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a table of exemplary per resource settings;

DETAILED DESCRIPTION OF THE PREFERRED EMBODIMENTS

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 4:
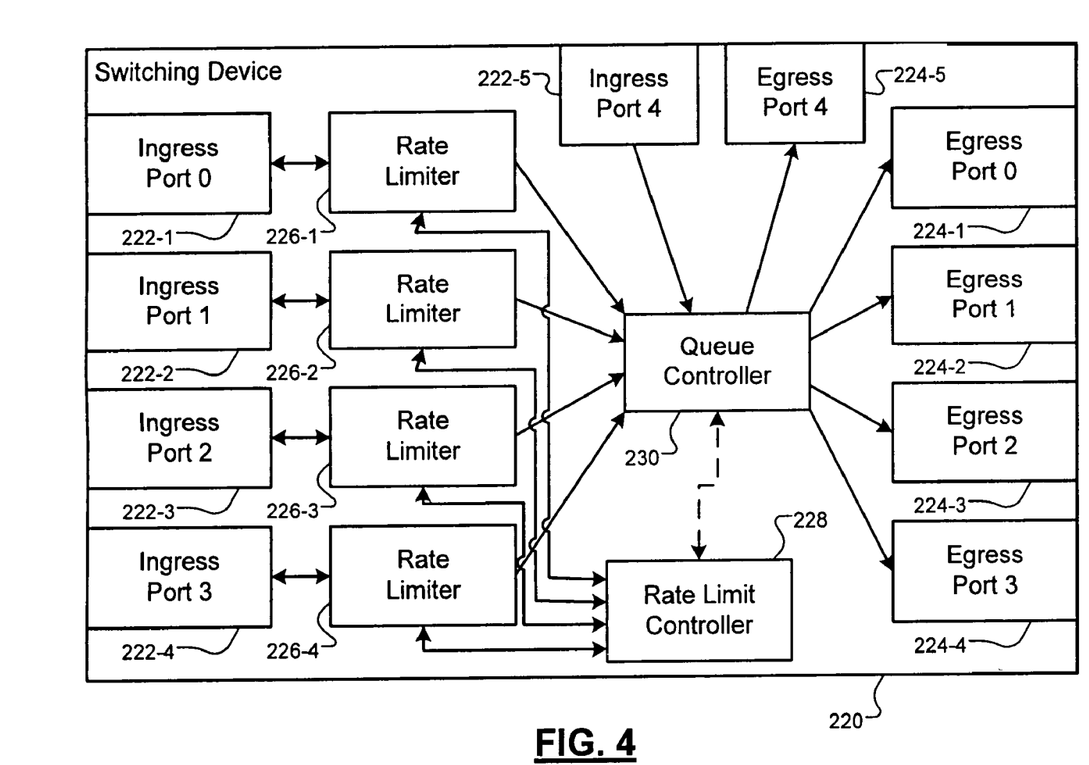
FIG. 4 is a functional block diagram of an exemplary switching device according to the principles of the present invention.

Referring now to FIG. 4, a functional block diagram of an exemplary switching device according to the principles of the present invention is presented. This switching device 220 may be, for example, a layer 2 switch, a layer 3 switch, a router, a bridge, and/or a core router, but in this discussion will be treated as an edge router. The switching device 220 has provision for five ports in this example, with four ports reserved for users, and the fifth port used as a trunk port. The switching device 220 may have greater or fewer number of ports, and may have no dedicated trunk ports or more than one trunk port. The five ports have ingress modules 222-1, 222-2, 222-3, 222-4, and 222-5, respectively, and egress modules 224-1, 224-2, 224-3, 224-4, and 224-5, respectively.

The ingress modules 222-1, 222-2, 222-3, and 222-4 communicate with rate limiters 226-1, 226-2, 226-3, and 226-4, respectively. In another implementation, the trunk port ingress module 222-5 may communicate with a rate limiter. The rate limiters 226 communicate with a rate limit controller 228. The rate limit controller 228 receives information about incoming packets and generates signals instructing the rate limiters 226 as to what action to take with the incoming packets. A queue controller 230 communicates with the rate limiters 226, the fifth port ingress module 222-5, and the egress modules 224. The queue controller 230 directs packets from one port to another based upon routing information stored within the packet. The queue controller may buffer packets if a particular egress port is congested, and may drop packets that can not be accommodated. Information regarding these dropped packets may be communicated to the rate limit controller 228 for use in making rate-limiting decisions.

The ingress modules 222 receive incoming packets and may check that the switching device 220 is a proper target of incoming packets and that the incoming packet has a valid checksum (or some other transmission validation, such as a Cyclic Redundancy Check). The ingress modules 222 may discard (or filter) packets that do not meet these or other conditions. Information regarding these dropped packets may be communicated to the rate limit controller 228, possibly via the corresponding rate limiter module 226, for use in making rate-limiting decisions. The rate limiters 226 may discard packets, tag packets, pass packets, and/or instruct the corresponding ingress module 222 to assert flow control.

Figure 5:
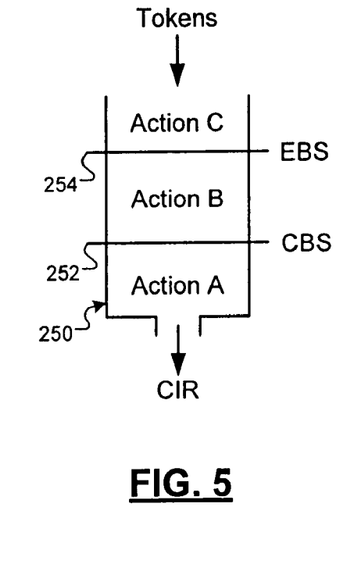
FIG. 5 is a graphical depiction of a leaky bucket traffic shaping algorithm.

The rate limit controller 228 may employ a leaky bucket traffic shaping algorithm, depicted graphically in FIG. 5. A bucket 250 receives tokens that correspond to arriving packets. The number of tokens may be proportional to the size of the packet in bytes, or may be a fixed value independent of size. Tokens flow out of the bucket 250 at a certain rate, referred to as the Committed Information Rate (CIR). If tokens arrive at a faster rate than the CIR, the bucket will begin to fill.

Until the tokens in the bucket 250 reach a first threshold 252, called the Committed Burst Size (CBS), packets are treated according to Action A. Action A usually includes passing (or accepting) the packet, and the corresponding tokens are added to the bucket 250. If the tokens corresponding to a packet will cause the tokens in the bucket 250 to exceed the CBS, a second action, Action B, is performed. Action B may also include simply passing the packet, or it may include dropping the packet.

If Action B includes passing the packet, the packet may be marked, or colored, to indicate that it violated a threshold. The color state may identify the packet as more preferable to drop when the queue controller (or other downstream packet handling device) experiences congestion and chooses to drop a packet. The color state may also cause the packet to receive low priority handling in the queue controller.

Action B may also include instructing the corresponding ingress port to assert flow control. Asserting flow control may include sending a PAUSE frame (defined in IEEE 802.3xy, which is incorporated herein in its entirety) for a full duplex connection, or applying backpressure for a half duplex connection. This instructs the upstream device to stop transmitting packets to the switching device 220. Action B may include asserting flow control while still passing the packet. This action should only be used when the upstream device is well-behaved; otherwise the upstream device might ignore flow control, causing the rate limit controller to keep passing violating packets.

Once flow control is asserted, the rate limit controller will determine when to de-assert flow control. This could occur after a fixed time period, or when the level of tokens in the bucket 250 falls to a certain point. This point may be when the bucket is empty or when the tokens in the bucket 250 fall below the CBS threshold.

If the tokens corresponding to a packet will cause the bucket 250 to exceed a second threshold 254, called the Excess Burst Size (EBS), Action C is performed on the packets. Any of the actions possible for Action B are also suitable for Action C. If Action C includes flow control, the point at which flow control is de-asserted might be when the tokens in the bucket 250 fall below EBS-CBS.

The leaky bucket algorithm restricts an incoming traffic flow to a certain average rate (the CIR), and offers the ability to incrementally deal with bursts of traffic arriving at speeds in excess of the CIR. The rate limit controller may alternately use a token bucket traffic shaping algorithm, which adds tokens to a bucket at a certain rate up to a specified limit, and arriving packets can use as many tokens as are present in the bucket. The token bucket thus allows for larger bursts of traffic, while enforcing an average traffic rate.

Some leaky bucket algorithms use loose thresholds, whereby a packet may be accepted even if the corresponding tokens will exceed the threshold. The algorithm will then wait until the bucket falls below the threshold before accepting any more packets. This allows larger packets (such as streaming multimedia, and especially video) to be accepted, even though their large size may exceed the bucket's threshold. A strict threshold requires the packet to be small enough that the corresponding tokens will not exceed the threshold. A strict threshold therefore tends to accept smaller packets when operating near the threshold while rejecting larger ones. This is advantageous, as TCP (Transmission Control Protocol) ACKs (Acknowledgement packets) are small, and dropping an ACK forces retransmission of the original data packet.

Figure 6:
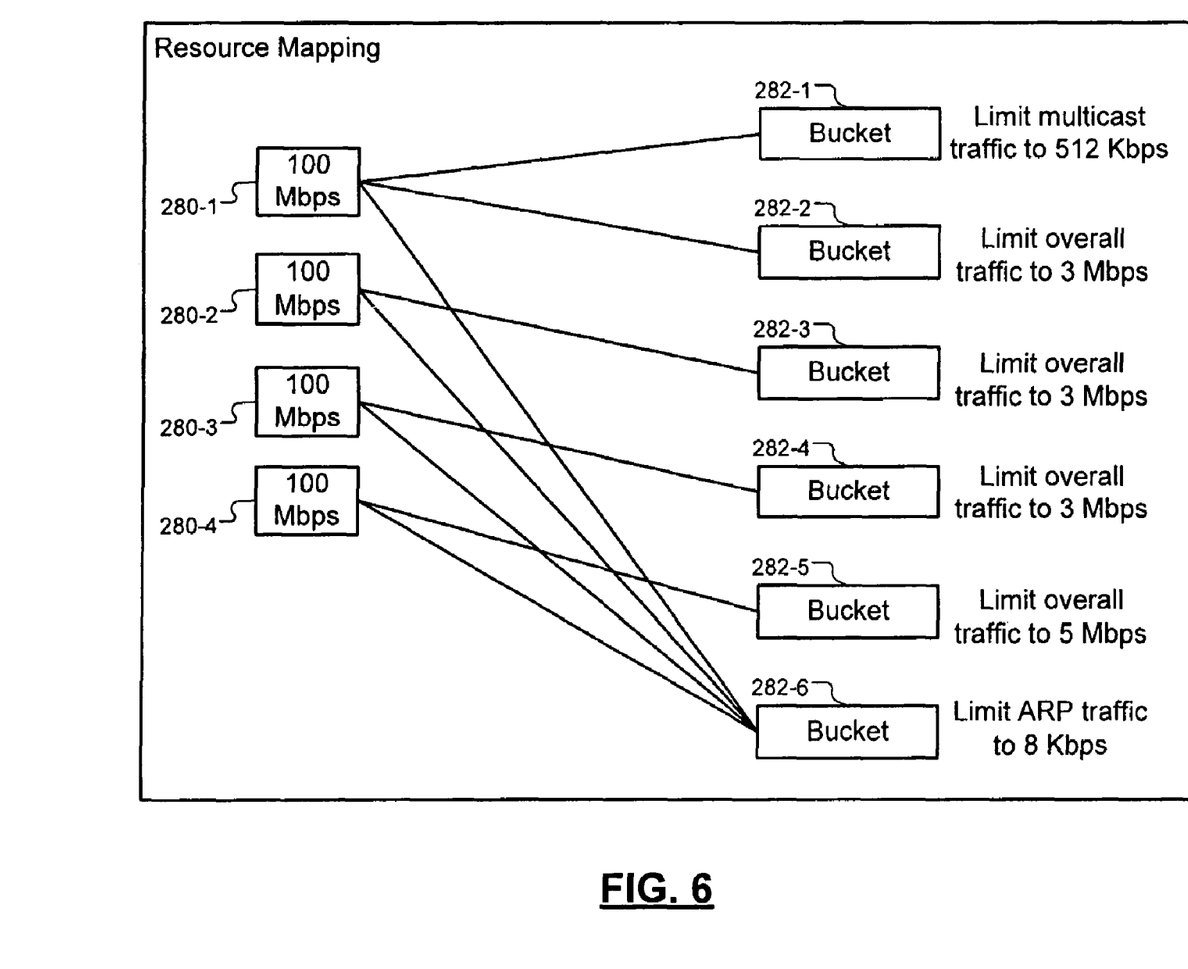
FIG. 6 is a graphical depiction of an exemplary assignment of buckets to ports.

Buckets such as those described in FIG. 5 can be assigned to one or more ports to limit various traffic rates of interest. FIG. 6 is a graphical depiction of an exemplary assignment of buckets to ports. Many other exemplary configurations are possible, and often there will be a greater number of buckets than ports. Six ports with twelve buckets is another exemplary implementation. Switches with multiples of six ports can be formed by replicating the six-port implementation, with each group of six ports sharing a group of twelve buckets.

In the example of FIG. 5, a first port 280-1 is assigned to first and second buckets 282-1 and 282-2. Second, third, and fourth ports 280-2, 280-3, and 280-4 are assigned to third, fourth, and fifth buckets 282-3, 282-4, and 282-5, respectively. The first, second, third, and fourth ports 280-1, 280-2, 280-3, and 280-4 are also assigned to a sixth bucket 282-6. The second, third, fourth, and fifth buckets 282-2, 282-3, 282-4, and 282-5 limit the overall traffic rate of the respective ports to 3 Mbps, 3 Mbps, 3 Mbps, and 5 Mbps, respectively. The first bucket 282-1 limits the rate of multicast traffic from the first port 280-1 to 512 Kbps. The sixth bucket 282-6 limits ARP (Address Request Protocol) traffic originating from any of the four ports 280 to an aggregate rate of 8 Kbps.

If the four ports 280 were link aggregated ports (as defined in IEEE 802.3ad, which is incorporated herein by reference in its entirety), they could be assigned to a single bucket that limits overall aggregate traffic. Link aggregation is a method of using multiple links in parallel between two devices to increase aggregate bandwidth. Assigning two (or more) link aggregated ports to the same bucket allows this aggregate bandwidth to be controlled. The four link aggregated ports could all also be assigned to various buckets that limit such things as ARP traffic, multicast traffic, broadcast traffic, unknown address traffic, and BPDU (Bridge Protocol Data Unit) traffic. Broader categories may be defined, such as management traffic, which may include BPDU and ICMP (Internet Control Message Protocol) traffic.

An aggregate broadcast traffic limit is useful in limiting the growth of a broadcast storm, where a mis-configured switching device causes broadcast packets to be endlessly replicated. An ARP traffic limit is useful in restricting ARP message floods used in a Denial of Service (DoS) attack. Ports which are not trusted, or which have previously generated malicious traffic, can receive lower limits or be grouped together into a single restricted-speed bucket.

Switching devices generally maintain address tables (such as a MAC address table) to map network addresses to switch ports. If a packet is directed to a network address that does not yet have a mapping (referred to as unknown traffic), the switching device usually floods the packet out of all of the connected ports except the incoming port. This behavior may be exploited in a DoS attack, and so limiting unknown unicast or unknown multicast packets may be a desired configuration.

Figure 7:
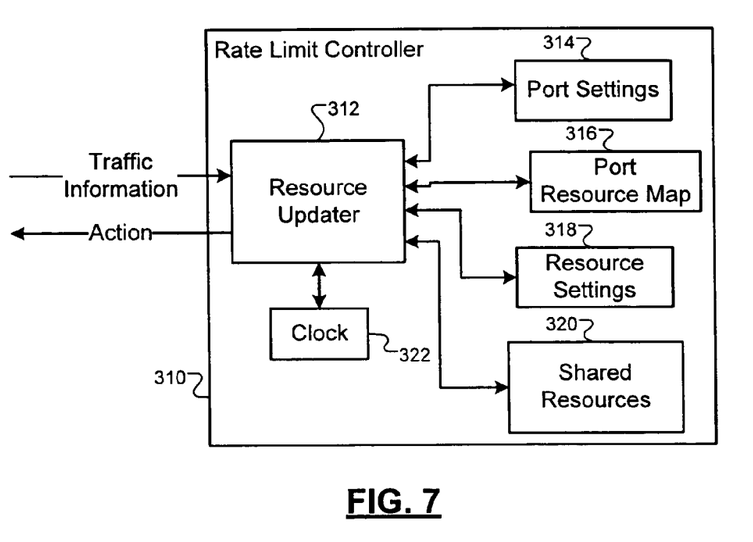
FIG. 7 is a functional block diagram of an exemplary implementation of a rate limit controller according to the principles of the present invention.

Referring now to FIG. 7, a functional block diagram of an exemplary implementation of a rate limit controller 310 according to the principles of the present invention is depicted. A resource updater module 312 receives traffic information from rate limiter modules (as depicted in FIG. 4), and relays action directions to the rate limiter modules. The resource update module 312 may also receive information from ingress ports and/or the queue controller. This information may be useful in altering which packets are counted. For instance, if a packet is discarded (or filtered) by an ingress module, its tokens might still be added to the corresponding bucket (i.e., counted against the user, even though it is discarded). The counterpart to this practice is that if the queue controller drops a packet because of congestion, its tokens may be ignored by the corresponding buckets, so that packets dropped due to congestion are not 'charged' to the user.

The resource updater module 312 communicates with a port settings module 314, a port resource map module 316, a resource settings module 318, a shared resources module 320, and a clock 322. The resource updater module 312 stores settings for each port (described in more detail with respect to FIG. 8) in the port settings storage module 314. The resource updater module 312 stores settings for resources (described in more detail with respect to FIG. 9) in the resource settings storage module 318. Some settings are independent for each bucket, while others are common.

The shared resources module 318 contains the shared resources, such as buckets as described in FIG. 5. The resource map module 316 specifies which shared resources from the shared resources module 320 correspond to each port (described in more detail with respect to FIG. 8). The resource map module 316 may be stored in the same memory as resource settings 318. Port settings 314 and resource settings 318 may be stored in the same memory. The resource updater module 312 uses information from the clock 322 (which may alternately be generated elsewhere) to remove tokens from the buckets at intervals corresponding to their respective CIRs (Committed Information Rates).

Figure 8:
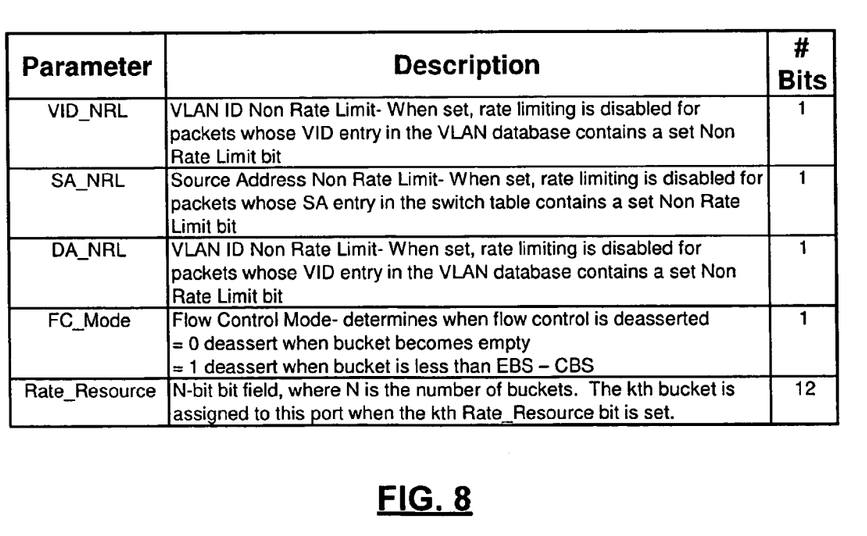
FIG. 8 is a table of exemplary per port settings.

Referring now to FIG. 8, a table of exemplary port settings is depicted. These settings are set independently for each port. Three non-rate-limit settings are included. Each one of these enables rate-limiting exemption for certain packets. The first, VID_NRL, allows packets to be exempted from rate-limiting for certain VLAN (Virtual Local Area Network) IDs. The second, SA_NRL, allows packets to be exempted from rate-limiting based upon their source address, and DA_NRL allows packets to be exempted from rate-limiting based upon their destination address.

The number of bits used for any setting may vary, but an exemplary number is given for each setting. Settings may also be multiplexed or stored in any other arrangement. The non-rate-limit enable settings are binary settings, and use one bit each. When VID_NRL is enabled, the rate limiter looks to the VLAN database to determine if a packet with a particular VLAN ID should be exempted. Likewise, when SA_NRL or DA_NRL is enabled, the rate limiter looks to the switch table to determine if a packet with a certain source address or destination address should be exempted.

A flow control mode setting (FC_Mode, 1 bit in size) specifies when flow control should be de-asserted. A first state such as 0 specifies that flow control should be de-asserted when the bucket(s) that instructed flow control to be asserted become empty. A second state such as 1 specifies that flow control should be de-asserted when the bucket(s) which instructed flow control to be asserted have few enough tokens to accept a packet the size of CBS (committed burst size); in other words, when the number of tokens is less than or equal to EBS (excess burst size)–CBS.

A Rate_Resource setting stores the resource mapping for the bucket. In this example, 12 resources are present, so Rate_Resource is a 12-bit bit field. Each bit that is set in Rate_Resource indicates that the corresponding resource is assigned to this port. As a bit field, zero, one, or multiple bits may be set within Rate_Resource. If no bits are set, the port is not assigned any resources, and thus is not rate limited.

Referring now to FIG. 9, a table of exemplary resource settings is depicted. These settings are stored individually for each resource. For simplicity, the resource discussed in this example will be a leaky bucket. CBS_Limit (24 bits) is the number of tokens that define the Committed Burst Size (CBS) limit of the bucket. EBS_Limit (24 bits) is the number of tokens that define the Extended Burst Size (EBS) limit of the bucket.

EBS_Limit_Action (1 bit) specifies what action should be taken when the tokens corresponding to a packet would exceed the EBS_Limit. In one implementation, a first state such as 0 corresponds to discarding the packet, and a second state such as 1 corresponds to passing the packet while asserting flow control. If the upstream device of a port has a trusted flow control mechanism, EBS_Limit_Action for each of the buckets assigned to that port should be set to the second state. A parallel field, CBS_Limit_Action, could be defined, but in this implementation, when tokens corresponding to a packet would exceed the CBS_Limit, flow control is asserted while passing the packet.

Account_Q_Congest (1 bit) determines whether packets discarded because of queue congestion should contribute tokens to the bucket. An analogous setting, Account_Filtered (1 bit), determines whether packets filtered within the switching device (such as at the ingress port) should contribute tokens to the bucket. If both settings are set to false, a user's packets are not counted against their rate quota if they are dropped because of errors within the packet, queue congestion, etc.

Bucket_Rate_Factor (16 bits) indicates how many tokens should be decremented from the bucket for each interval of time. Bucket_Rate_Factor is thus directly proportional to the CIR (Committed Information Rate). A Bucket_Rate_Type (1 bit) setting specifies how to calculate tokens from packet contents. In one implementation, a first state such as 0 corresponds to tokens only being counted for certain packet types. A second state such as 1 corresponds to certain bytes of every packet being counted as tokens.

A Bucket_Type_Mask (11 bits) setting determines which packet types (as identified by fields in the packet header or other indicators) generate tokens when Bucket_Rate_Type is in the first state. Bucket_Type_Mask is a bit field, allowing each type to be individually selected. Packet types in this implementation include unknown unicast, unknown multicast, broadcast, multicast, unicast, management, and ARP (Address Request Protocol). Many other packet types and/or groupings are possible. The Bucket_Type_Mask setting includes provision for four more, as eleven bits are available and only seven types are defined.

A Bits_To_Count (3 bits) setting determines which bits of a packet generate tokens when Bucket_Rate_Type is in the second state. Bits_To_Count is a bit field, and each set bit excludes more packet bits from the calculation. With Bits_To_ Count cleared, all packet bits are counted. This number may be determined from a layer 2 size reported by the ingress module plus preamble, SFD (Start Frame Delimiter), and IFG (InterFrame Gap). For simplicity, the preamble can be assumed to be a constant 7 bytes, the SFD 1 byte, and the IFG 12 bytes. Setting a first bit excludes layer 1 bits from the calculation. Setting a second bit excludes layer 2 bits from the calculation. A third bit is reserved, but might be used to exclude layer 3 bits.

Bucket_Increment (12 bits) specifies how many tokens are added to the bucket for each unit (byte) of qualifying port traffic. Bucket_Token_Count (24 bits) stores the number of tokens currently within the bucket. Last_Updated_Time (8 bits) stores the interval number when the Bucket_Token_Count was last updated. Bytes_Dropped (16 bits) indicates the number of bytes of packets dropped corresponding to the bucket. Bytes_Received (16 bits) indicates the number of bytes of packets received by ports corresponding to the bucket. The Bytes_Dropped and Bytes_Received counters do not have a maximum value and so wrap around (the adder carry bit is discarded).

Two settings not depicted in FIG. 9, because they are common to all buckets, are Current_Time_Update_Interval (3 bits) and Current_Time (8 bits). Current_Time_Update_Interval functions essentially as a clock divisor. The rate limiter module increments Current_Time every Current_Time_Update_Interval number of clock ticks. The values of Current_Time_Update_Interval may be powers of 2, or may be less exponential (such as 2, 4, 8, 16, 24, 36, 48, and 72). As an example, with a clock rate of 50 MHz (20 ns period) and a Current_Time_Update_interval of 4, current time is incremented every 80 ns.

Suggestions for values to use as the settings of FIG. 9 may include the following. Bucket_Rate_Factor is expressed in tokens per interval. To set the Bucket_Rate_Factor based upon CIR, the CIR needs to be converted: Bucket_Rate_Factor (tokens/interval)=Bucket_Increment (tokens/byte)*1/8 (bytes/bit)*CIR (bits/s)*clock speed (s/clock tick)

*Current_Time_Update_Interval (clock ticks/interval). EBS_Limit can be set as follows: EBS_Limit (tokens)=(Expected burst rate (bits/s)−CIR (bits/s))*Expected burst duration (s)*1/8 (bytes/bit)*Bucket_Increment (tokens/byte). CBS_Limit can be determined similarly.

Bucket_Increment should be inversely related to CIR so that their product is not disproportionately large for the size of Bucket_Token_Count (24 bits in this case). CBS_Limit should be greater than Bucket_Increment times the MTU (Maximum Transmission Unit) of any of the associated ports. This will guarantee that the bucket, when empty, will be able to accept MTU-sized packets without violating the CBS threshold.

A larger Current_Time_Update_Interval allows for a larger, and thus more granular, Bucket_Rate_Factor. For example, if Current_Time Update_Interval is 1 and Bucket_Rate_Factor is 1, Bucket_Rate_Factor cannot be changed without doubling its value. Increasing Current_Time_Update_Interval to 8 allows Bucket_Rate_Factor to vary from 8 to 9, only a 12% increase. Increasing Current_Time_Update_Interval must be done carefully, however so as not to increase Bucket_Rate_Factor beyond its storage size (16 bits in this case).

Figure 10:
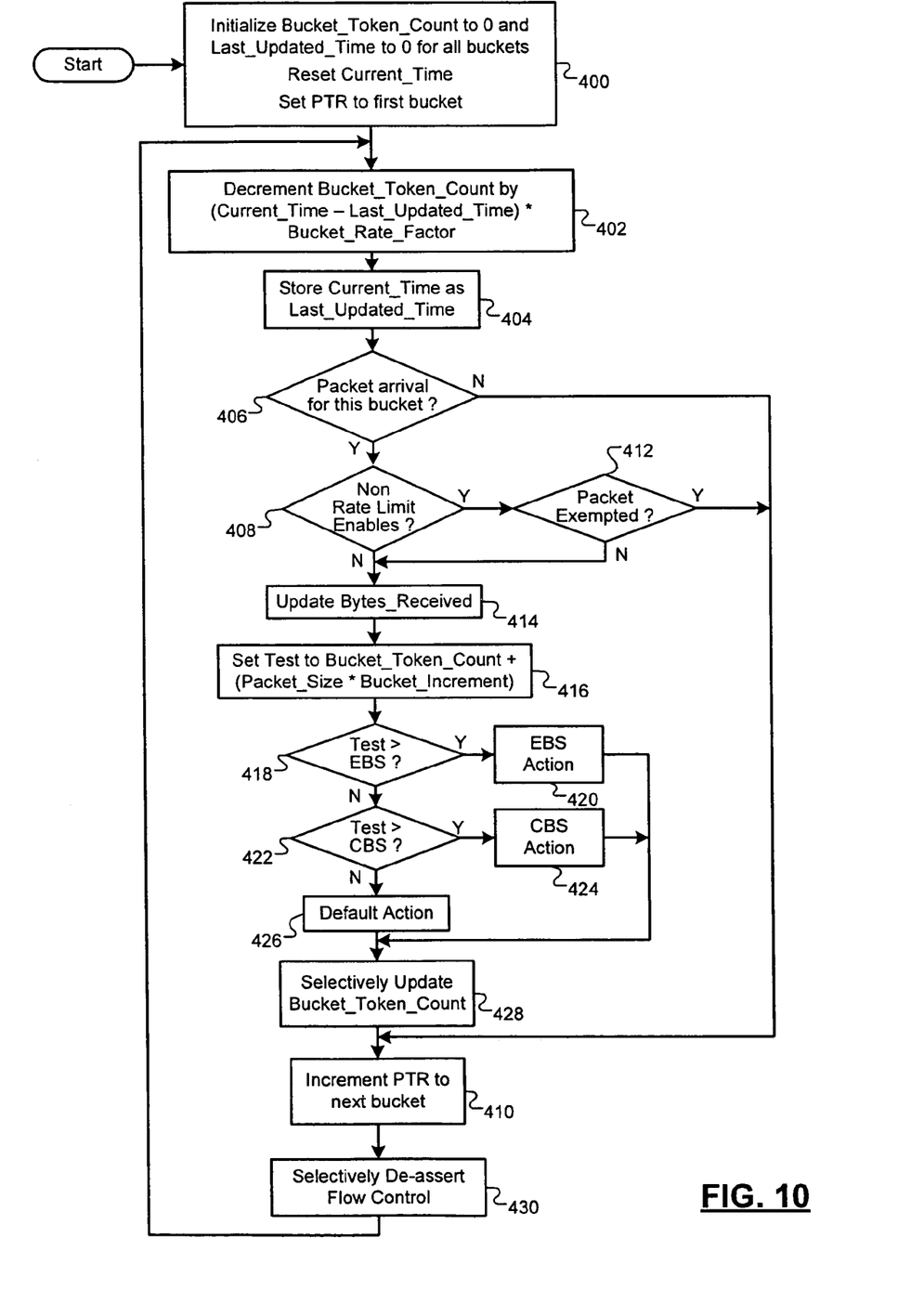
FIG. 10 is a flow chart depicting exemplary steps performed by the rate limit controller.

Referring now to FIG. 10, a flow chart of exemplary steps performed by the rate limit controller is presented. Control starts at step 400 where Bucket_Token_Count is initialized to zero and Last_Updated_Time is initialized to zero for each bucket. Current_Time is reset, and a pointer variable PTR is set to the first bucket. Control transfers to step 402 where Bucket_Token_Count is decremented by (Current_Time−Last_Updated_Time)*Bucket_Rate_Factor. As Current_Time wraps around, and thus may be less than Last_Updated_Time, it is assumed that the binary subtraction logic used will account for this effect.

Control transfers to step 404 where Current_Time is stored into Last_Updated_Time for the bucket referenced by PTR. Control transfers to step 408 where, if there is a packet arrival corresponding to this bucket, control transfers to step 408; otherwise control transfers to step 410. In step 408, if any non-rate-limit enables (VID_NRL, SA_NRL, DA_NRL) are set, control transfers to step 412; otherwise control transfers to step 414. In step 412, if the current packet's parameter (VID, SA, or DA) entry in the VLAN or switching table indicates the packet should be exempted, control transfers to step 410; otherwise control transfers to step 414.

In step 414 Bytes_Received for the bucket referenced by PTR is incremented by the number of bytes in the packet. Control continues in step 416 where a variable Test is set to Bucket_Token_Count+(Packet_Size*Bucket_increment). Packet_Size is based upon Bucket_Rate_Type and Bucket_Type_Mask or Bits_To_Count, as discussed with respect to FIG. 9.

Control continues in step 418 where, if Test is greater than EBS_Limit, control transfers to step 420; otherwise control transfers to step 422. In step 422, if Test is greater than CBS_Limit, control transfers to step 424; otherwise control transfers to step 426. In step 420, the rate limit controller communicates the action dictated by EBS_Limit_Action to the corresponding rate limit module and control continues with step 428. In step 424, the rate limit controller communicates accepting the packet and asserting flow control (or the action dictated by CBS_Limit_Action, if it were defined) to the corresponding rate limit module, and control continues with step 428.

In step 426, the rate limit controller communicates the default action to the corresponding rate limit module and control continues with step 428. The default action usually includes passing the packet. In step 428 control selectively updates Bucket_Token_Count, as described below with respect to FIG. 11. Control continues with step 410, where PTR is incremented modulo the number of buckets. In other words, if PTR pointed to the last bucket, it will wrap around to the first bucket. Control continues with step 430 where flow control is selectively de-asserted. Flow control is de-asserted if the bucket has instructed a port to assert flow control and the bucket's level has fallen below the level specified by FC_Mode. Control then returns to step 402, where the process is repeated.

The steps of FIG. 10 may be repeated in a loop for each of the ports in the switching device. In this way, a packet arriving at the first port is analyzed by all buckets as detailed in FIG. 10, then a packet arriving at the second port is analyzed by all buckets, etc. For a packet arriving at a certain port, if any of the buckets specify that flow control should be asserted, the port should assert flow control. Likewise, if any of the buckets specify that the packet should be dropped, the rate limiter module should drop the packet.

Figure 11:
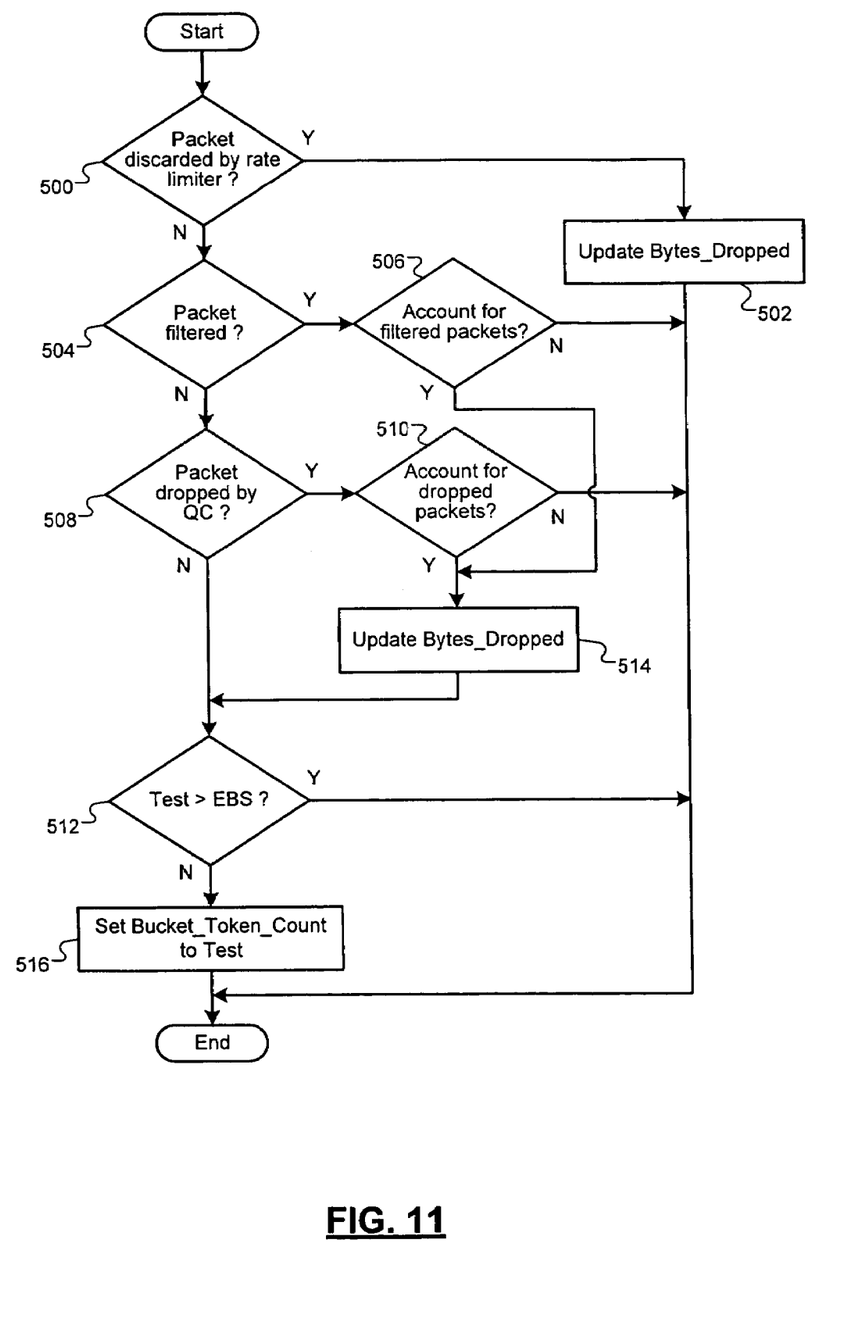
FIG. 11 is a flow chart depicting exemplary steps performed to update Bucket_Token_Count.

Referring now to FIG. 11, a flow chart of exemplary steps performed by the rate limit controller to update Bucket_Token_Count is presented. Control starts at step 500 where, if the current action includes discarding the packet, control transfers to step 502; otherwise control transfers to step 504. In step 502, Bytes_Dropped is incremented by the number of bytes in the packet, and control ends. In step 504, if the packet is filtered (such as by the ingress module), control transfers to step 506; otherwise control transfers to step 508. In step 506, if filtered packets are accounted for (Account_Filtered is 1), control transfers to step 514; otherwise control ends.

In step 508, if the packet is dropped by the queue controller, control transfers to step 510; otherwise control transfers to step 512. In step 510, if dropped packets are accounted for (Account_Q_Congest is 1), control transfers to step 514; otherwise control ends. In step 514 Bytes_Dropped is incremented by the number of bytes in the packet, and control transfers to step 512. In step 512, if Test is greater than EBS_Limit, control ends; otherwise control transfers to step 516. In step 516, Bucket_Token_Count is updated to the value of Test, and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A switching device comprising:
M ports;
N bandwidth tracking modules, each having an adjustable first threshold, an adjustable rate, and a fullness level, wherein M and N are integers that are greater than one;
a mapping memory containing a map for each of said M ports, wherein each map assigns a set of said N bandwidth tracking modules to a corresponding one of said M ports, wherein each of said sets is individually modifiable to include zero to N of said N bandwidth tracking modules; and
a rate limiting module that selectively performs an action on a packet received at one of said M ports based on said fullness levels of said set of N bandwidth tracking modules identified by said map for said one of said M ports.

2. The switching device of claim 1 wherein said rate limiting module decreases said fullness levels of each of said N bandwidth tracking modules at said rates, and selectively increases said fullness levels of said set of N bandwidth tracking modules identified by said map for said one of said M ports.

3. The switching device of claim 1 wherein said packet is selectively exempted from said action.

4. The switching device of claim 1 wherein said packet is selectively exempted from said action based upon a property of said packet, wherein said property includes at least one of VLAN ID, source address, and destination address.

5. The switching device of claim 1 further comprising a bandwidth tracking module memory that includes an array of N values to store said fullness levels of said N bandwidth tracking modules.

6. The switching device of claim 5 wherein said bandwidth tracking module memory also stores said first thresholds and said rates of said N bandwidth tracking modules.

7. The switching device of claim 2 wherein said rate limiting module selectively increases said fullness level of one of said N bandwidth tracking modules by a number based upon said packet using a calculation that can be adjusted individually for each one of said N bandwidth tracking modules.

8. The switching device of claim 7 wherein said calculation can be selected from at least one of a packet size calculation and a packet criteria calculation.

9. The switching device of claim 8 wherein said packet size calculation causes said number to be proportional to a size in bytes of said packet.

10. The switching device of claim 9 wherein said number is equal to said size in bytes multiplied by a multiplier, wherein said multiplier can be adjusted individually for each of said N bandwidth tracking modules.

11. The switching device of claim 9 wherein said size in bytes excludes a portion of bits of said packet, wherein said portion can be adjusted individually for each of said N bandwidth tracking modules.

12. The switching device of claim 11 wherein said portion includes at least one of layer one bits, layer two bits, and layer three bits.

13. The switching device of claim 8 wherein selecting said packet criteria calculation causes said number to be proportional to a size in bytes of said packet if said packet meets certain criteria, and equal to zero otherwise, wherein said criteria can be modified individually for each of said N bandwidth tracking modules.

14. The switching device of claim 13 wherein said criteria include packet type, and wherein said packet type is determined from information within said packet.

15. The switching device of claim 14 wherein said packet type includes at least one of unknown unicast, unknown multicast, broadcast, multicast, unicast, BPDU, ICMP, and ARP.

16. The switching device of claim 2 further comprising a clock, wherein said rate limiting module uses said clock slowed by a divisor to decrease said fullness levels of said N bandwidth tracking modules, and wherein said divisor is selectable.

17. The switching device of claim 3 further comprising a port setting memory that contains settings for each of said M ports, including a setting specifying when to exempt said packet from said action.

18. The switching device of claim 17 wherein said port setting memory includes said mapping memory.

19. The switching device of claim 2 wherein said action is determined based upon individual actions dictated by said set of N bandwidth tracking modules identified by said map for said one of said M ports.

20. The switching device of claim 19 wherein an individual action of one of said N bandwidth tracking modules includes a first action type when a number corresponding to said packet would increase said fullness level of said one of said N bandwidth tracking modules above said first threshold, and includes a second action type otherwise.

21. The switching device of claim 20 wherein said action types include at least one of discarding said packet, asserting flow control on said one of said M ports, and accepting said packet.

22. The switching device of claim 21 wherein said action includes discarding said packet when any of said individual actions include discarding said packet, and includes asserting flow control when any of said individual actions include asserting flow control.

23. The switching device of claim 1 wherein said N bandwidth tracking modules each have an individually defined second threshold, and wherein said action is determined based upon individual actions dictated by said set of N bandwidth tracking modules identified by said map for said one of said M ports.

24. The switching device of claim 23 wherein an individual action of one of said N bandwidth tracking modules includes a first action type when a number corresponding to said packet would increase said fullness level of said one of said N bandwidth tracking modules above said second threshold, a second action type when said number would increase said fullness level of said one of said N bandwidth tracking modules above said first threshold, and a third action type otherwise.

25. The switching device of claim 24 wherein said action types include at least one of discarding said packet, asserting flow control on said one of said M ports, and accepting said packet.

26. The switching device of claim 25 wherein said action includes discarding said packet when any of said individual actions include discarding said packet, and includes asserting flow control when any of said individual actions include asserting flow control.

27. The switching device of claim 1 wherein N is greater than M.

28. A switching method comprising:
receiving a packet at one of M ports;
setting a first threshold, a rate, and a fullness level for each of N bandwidth tracking modules, wherein M and N are integers that are greater than one;
establishing an assignment for each of said M ports, wherein each assignment is from a set of said N bandwidth tracking modules to a corresponding one of said M ports, and wherein each of said sets is individually modifiable to include zero to N of said N bandwidth tracking modules; and
selectively performing an action on said packet based upon fullness levels of said set of N bandwidth tracking modules identified by said assignment for said one of said M ports.

29. The method of claim 28 further comprising decreasing said fullness levels of each of said N bandwidth tracking modules at said rates, and selectively increasing said fullness levels of said set of N bandwidth tracking modules identified by said assignment for said one of said M ports.

30. The method of claim 28 wherein said packet is selectively exempted from said performing based upon a property of said packet, wherein said property includes at least one of VLAN ID, source address, and destination address.

31. The method of claim 29 wherein said increasing includes calculating a number based upon said packet and increasing said fullness level of a corresponding one of said N bandwidth tracking modules by said number, wherein said calculating can be varied individually for each of said N bandwidth tracking modules.

32. The method of claim 31 wherein said calculating includes at least one of a packet size calculation and a packet criteria calculation.

33. The method of claim 32 wherein said packet size calculation results in said number being proportional to a size in bytes of said packet.

34. The method of claim 33 wherein said packet size calculation includes multiplying said size in bytes by a multiplier, wherein said multiplier can be adjusted individually for each of said N bandwidth tracking modules.

35. The method of claim 33 further comprising excluding a portion of bits of said packet from said size in bytes, wherein said portion can be adjusted individually for each of said N bandwidth tracking modules.

36. The method of claim 35 wherein said portion includes at least one of layer one bits, layer two bits, and layer three bits.

37. The method of claim 32 wherein said packet criteria calculation results in said number being proportional to a size in bytes of said packet if said packet meets certain criteria, and equal to zero otherwise, wherein said criteria can be modified individually for each of said N bandwidth tracking modules.

38. The method of claim 37 wherein said criteria include packet type, and wherein said packet type is determined from information within said packet.

39. The method of claim 38 wherein said packet type includes at least one of unknown unicast, unknown multicast, broadcast, multicast, unicast, BPDU, ICMP, and ARP.

40. The method of claim 29 further comprising slowing a clock by a divisor to determine times at which to decrease said fullness levels of said N bandwidth tracking modules, wherein said divisor is selectable.

41. The method of claim 29 further comprising determining said action based upon individual actions specified for said set of N bandwidth tracking modules identified by said assignment for said one of said M ports.

42. The method of claim 41 wherein an individual action of one of said N bandwidth tracking modules includes a first action type when a number corresponding to said packet would increase said fullness level of said one of said N bandwidth tracking modules above said first threshold, and includes a second action type otherwise.

43. The method of claim 42 wherein said action types include at least one of discarding said packet, asserting flow control on said one of said M ports, and accepting said packet.

44. The method of claim 43 wherein said action includes discarding said packet when any of said individual actions include discarding said packet, and includes asserting flow control when any of said individual actions include asserting flow control.

45. The method of claim 28 wherein said N bandwidth tracking modules each have an individually defined second threshold, and further comprising determining said action based upon individual actions dictated by said set of N bandwidth tracking modules identified by said assignment for said one of said M ports.

46. The method of claim 45 wherein an individual action of one of said N bandwidth tracking modules includes a first action type when a number corresponding to said packet would increase said fullness level of said one of said N bandwidth tracking modules above said second threshold, a second action type when said number would increase said fullness level of said one of said N bandwidth tracking modules above said first threshold, and a third action type otherwise.

47. The method of claim 46 wherein said action types include at least one of discarding said packet, asserting flow control on said one of said M ports, and accepting said packet.

48. The method of claim 47 wherein said action includes discarding said packet when any of said individual actions include discarding said packet, and includes asserting flow control when any of said individual actions include asserting flow control.

49. The method of claim 28 wherein N is greater than M.

* * * * *